United States Patent [19]

DeFino et al.

[11] Patent Number: 4,471,165

[45] Date of Patent: Sep. 11, 1984

[54] PORTABLE KEYBOARD OPERATED TELECOMMUNICATIONS SYSTEM

[75] Inventors: John M. DeFino, Burleson, Tex.; John W. Stannard, Los Gatos; Gary G. Voget, Cupertino, both of Calif.; Rufus Coomer, Fort Worth, Tex.

[73] Assignee: Pinetree Systems, Inc., Grand Prairie, Tex.

[21] Appl. No.: 202,020

[22] Filed: Oct. 28, 1980

[51] Int. Cl.³ .................. G06F 3/023; H04M 11/08
[52] U.S. Cl. ................................ 179/2 A; 179/2 C
[58] Field of Search ............... 179/2 DP, 2 R, 2 C, 179/2 AM, 2 CA, 2 A

[56] References Cited

U.S. PATENT DOCUMENTS

| | | | |
|---|---|---|---|
| 3,507,997 | 4/1970 | Weitbrecht | 179/2 DP |
| 3,516,062 | 6/1970 | Spraker | 179/2 DP X |
| 3,675,513 | 7/1972 | Flanagan et al. | 179/84 VF |
| 3,746,793 | 7/1973 | Sachs et al. | 179/2 DP |
| 3,746,794 | 7/1973 | Stifle et al. | 179/2 DP |
| 3,760,171 | 9/1973 | Wang et al. | 235/156 |
| 3,870,821 | 3/1975 | Steury | 179/2 DP |
| 3,896,267 | 7/1975 | Sachs et al. | 179/2 TV |
| 3,976,840 | 8/1976 | Cleveland et al. | 179/2 DP |
| 4,007,443 | 2/1977 | Bromberg et al. | 364/900 |
| 4,012,594 | 3/1977 | Paller | 179/2 DP |
| 4,012,599 | 3/1977 | Meyer | 179/84 VF |
| 4,038,651 | 7/1977 | McGraw | 179/2 DP X |
| 4,268,721 | 5/1981 | Nielson et al. | 179/2 C |
| 4,291,198 | 9/1981 | Anderson et al. | 179/2 DP |
| 4,326,102 | 4/1982 | Culp et al. | 179/2 C |
| 4,375,060 | 2/1983 | Horyu | 340/365 R |

FOREIGN PATENT DOCUMENTS

| | | | |
|---|---|---|---|
| 2749923 | 5/1979 | Fed. Rep. of Germany | 179/2 DP |
| 44283 | 3/1980 | Japan | 179/2 A |

OTHER PUBLICATIONS

Model-DP 2001 Data Prompter, brochure, Pinetree Systems, Inc., 1979.

*Primary Examiner*—Thomas W. Brown
*Attorney, Agent, or Firm*—Richards, Harris & Medlock

[57] ABSTRACT

A portable handheld battery operated telecommunications terminal (10) is acoustically coupled to a telephone hand set for the transmission and reception of alphanumeric information over ordinary telephone lines. A standard typewriter ASCII keyboard (34) enables the encoding of messages for transmission on a character by character basis (Baudot code) or the entire message to a second communications terminal (10) with the same transmission protocol. A visual display (32) provides a display of data for editing the encoded message prior to transmission and for display of a message received from a second communications terminal (10). A microprocessor (50) is programmed by processor instructions stored in EPROMs (66) and (68) for controlling operation of the communications terminal (10) from entries from the keyboard (34). A transmit audio transducer (76) and receive audio transducer (84) transmit and receive audio tones over ordinary telephone lines in the frequency shift key transmission mode in response to pulses from the programmed microprocessor (50). Random access memories (62) and (64) enable the user to store an entire message for editing prior to transmission, to enter blocks of alphanumeric information for subsequent transmission, and to store a received message for redisplay of the message in the visual display (32).

1 Claim, 8 Drawing Figures

PORTABLE KEYBOARD OPERATED TELECOMMUNICATIONS SYSTEM

TECHNICAL FIELD

This invention relates to portable keyboard operated telecommunication systems having a visual display, and more particularly to such a system having a microprocessor controlled audio transducer for transmitting and receiving alphanumeric information over voice grade transmission lines of a telephone network.

BACKGROUND ART

Communications between deaf persons or the hearing impaired have been previously accomplished by telecommunication systems using voice grade telephone lines connecting two terminals of the system. In one such telecommunication system, a telegraph system utilizes two Teletypewriters as the transmitting and receiving stations for connecting these two terminals for carrying signals over ordinary telephone lines. U.S. Pat. No. 3,507,997 issuing to R. H. Weitbrecht on Apr. 21, 1970 is an example of such a telegraph system for enabling communications between the hearing impaired. The system includes a separate keying unit, a transmitter unit, receiver unit and teleprinter for each of the stations in a communications network connected by ordinary telephone circuits. The system is not designed to enable a user to readily transport the system by carrying it on his person, and the Teletypewriter produces a hard copy of the transmitted text which may disturb the others within the vicinity of the teletypewriter by the resulting noise.

Another type of telecommunication system for the hearing impaired includes a separate keyboard entry terminal for encoding an operator's message and an ordinary television receiver connected to the terminal to display both the message as it is typed as well as the message as it is received. The encoded message is transmitted by an acoustic coupler for coupling the telephone receivers to transmit the signals over ordinary voice grade telephone lines. U.S. Pat. No. 3,746,793 discloses such a system, and U.S. Pat. No. 3,896,267 discloses an improvement to that system by means of a switch which enables the encoded keyboard entries to be transmitted in either Baudot or ASCII code.

Yet another approach to enable communications between the deaf or hearing impaired over telephone lines has been accomplished by use of the twelve- or sixteen-key pushbutton telephones as the means for coding and transmitting messages containing alphanumeric data to another terminal of the system. U.S. Pat. No. 3,870,821 discloses such a system, but the system requires a separate printer for providing a hard copy of a message on tape, as well as requiring the user to learn a special code requiring the depression of several keys to generate a single alpha or numeric character. U.S. Pat. Nos. 3,675,513 and 4,012,599 disclose additional telephone communication systems for the deaf which require the use of special codes for the keys of a pushbutton telephone for generating characters to be transmitted to another terminal of the system. In addition to enabling communications between the hearing impaired, keyboard encoded communications terminals have also been provided to enable a user to access a central computer facility and transmit data to the computer over voice grade telephone lines.

A need has thus arisen for an improved, easier to operate portable communications terminal in a telecommunications system for transmitting and receiving messages over ordinary telephone lines for improving communications between deaf and hearing impaired and for improving the transmission and reception of data to a remote central data processing facility for a portable terminal.

SUMMARY OF THE INVENTION

In accordance with the present invention, a compact lightweight portable communications terminal is provided for transmitting and receiving keyboard encoded information over ordinary telephone lines. The communications terminal may be used anywhere there is an ordinary telephone set so that the terminal may be acoustically coupled to the remainder of the telecommunications system. A visual display area is provided on front of the communications terminal for improving the speed in the encoding and transmission of alphanumeric information between deaf or hearing deficient persons.

In accordance with another aspect of the invention, a transmission mode selection means is provided for enabling a communications terminal of the system to communicate with another terminal of the system in its own protocol or to communicate with a different terminal using the standard TTY TeleType by transmission code (Baudot). In the transmission mode of the present invention, a message may be encoded, stored and edited prior to transmitting to another terminal for improved accuracy and speed in transmitting a message. Similarly, in the receive mode the entire message may be received and displayed at the time of transmission or stored in memory for subsequent replay.

In accordance with another aspect of the present invention, an audio transducer is pulsed by a microprocessor for transmitting alphanumeric information over ordinary telephone lines. The microprocessor is programmed to pulse the audio transducer and eliminate the need for other electronic devices to generate audio tones, resulting in a substantial savings in space and weight in the design of the communications terminal and eliminating the need for any external modems as part of the communications system.

In accordance with yet another aspect of the present invention, random access memory means are provided to enable the user to encode and store standard blocks of alphanumeric information in memory. The user can store a number of standard phrases and personal identification information in memory and recall these phrases for transmission to substantially reduce the time necessary to encode this information for transmission.

In accordance with yet another aspect of the present invention, a communications terminal of the telecommunications system may be utilized to transmit and receive data to an electronic digital signal processor, such as a remote central data processing system located at the home office of a company. Random access memory means are provided for encoding and storing standard access codes for the central data processing facility, as well as other routine portions of the data transmission to result in a savings in encoding the information. A visual display screen can display information received from the central data processing unit in response to inquiries transmitted by the user, as well as information that is transmitted. The communications terminal may be utilized to enable a user in a remote location from a central data processing unit to transmit and receive information from a data processing unit over standard voice grade telephone lines.

BRIEF DESCRIPTION OF DRAWINGS

A more complete understanding of the present invention and its advantages will be apparent from the following Detailed Description taken in conjunction with the accompanying drawings in which.

DETAILED DESCRIPTION

Figure 1:
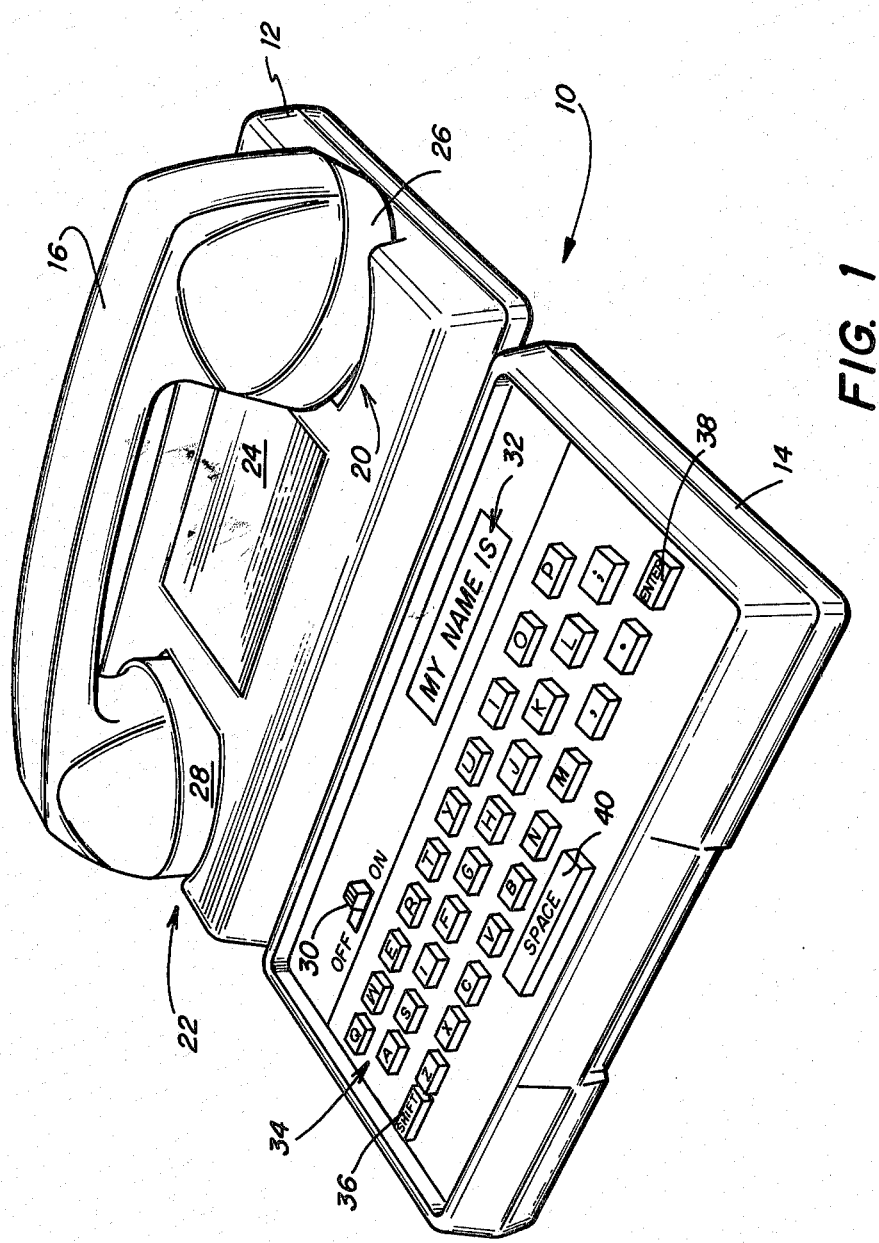
FIG. 1 is a perspective view of a communications terminal of the present invention acoustically coupled to a standard telephone receiver.

FIG. 1 illustrates a portable communications terminal of the telecommunications system of the present invention and is generally identified by the numeral 10. The communications terminal 10 is designed to have an acoustic coupling unit 12 hingedly attached to a keyboard and display unit 14. The terminal 10 in FIG. 1 is illustrated in the open position for use with a standard telephone hand set 16 secured to the acoustic coupling unit 12 by fitting hand set 16 into the indentations 20 and 22 molded into the face plate 24 of the coupling unit 12 for accommodating the earpiece 26 and mouthpiece 28 of the hand set 16.

The keyboard and display unit 14 includes a power on/off switch 30 for turning the battery operated terminal 10 on and off. A visual display area 32 on the display unit 14 provides a scrolled or rolled visual display means for visualizing messages as they are encoded at the keyboard 34 and for displaying messages as they are received when the unit 14 is functioning as a receiver. The visual display 32 may also be used to visually indicate the incorrect entry of data as well as to indicate to the user the receipt of an incoming telephone message.

The keyboard and display unit 14 also includes the keyboard 34 generally arranged as a standard typewriter keyboard display. In addition to the entry of alphanumeric characters, a shift key 36 may be used in combination with certain alphabetic keys to select the program in storage to control the operation of the unit 10, such as the entry of alphanumeric information for transmission, the entry of alphanumeric information for semi-permanent storage, the editing of alphanumeric information, the selection of the transmission mode for the entered message as well as the receipt and delayed playback of messages. The "ENTER" key 38 and "SPACE" bar 40 are available to the user to control the entry of alphanumeric information as well as the "SPACE" function for separating words as desired by the user.

Figure 2:
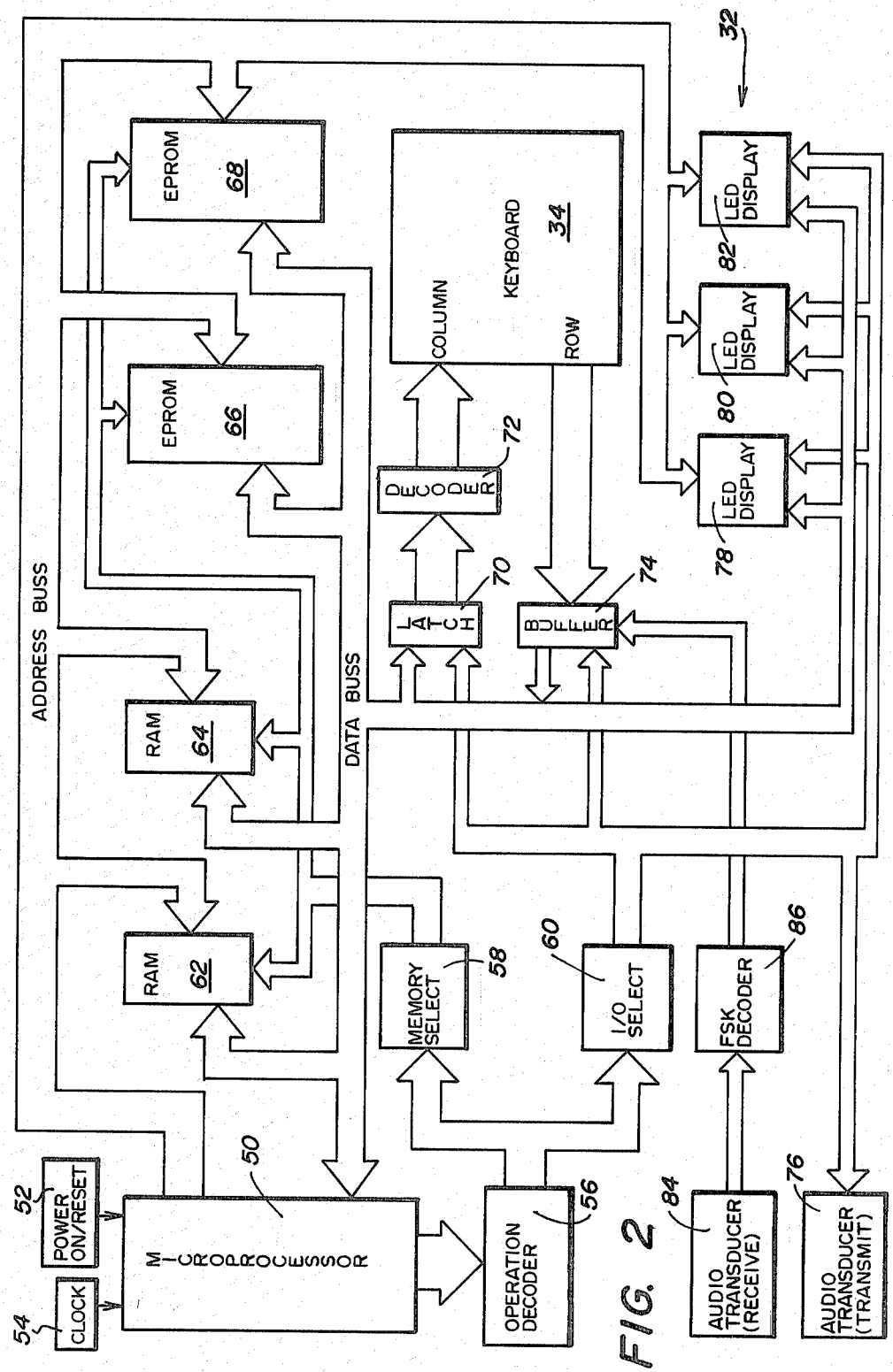
FIG. 2 is a block diagram view of a communications terminal of the present invention.

FIG. 2 illustrates the communications terminal 10 in block/diagram form. A microprocessor 50 is programmed to control the operation of the computer terminal 10. Power on/reset circuitry 52 and clock circuitry 54 provide the microprocessor 50 with a two megahertz clock signal. An operation decoder 56, memory select logic 58 and input/output select logic 60 are responsive to the microprocessor 50 to determine if it is to read memory, write memory, read from an input/output or write to an input/output.

If the microprocessor 50 is selecting a memory operation, the operation decoder 56 and memory select logic 58 determine which memory the microprocessor 50 selects. The available memory includes two 8-bit CMOS random access memories (RAM) which are constantly powered regardless of the on/off state of the communications terminal 10. The volatile memory provided by the two RAMs 62 and 64 provides means for storing introductory information and often repeated phrases for reducing the keyboard time in encoding this information when the terminal is programmed for use as a communicator for the deaf or hard of hearing persons. The RAMs 62 and 64 also provide the means for encoded messages for editing in the transmission mode or delayed replay in the receive mode. When the communications terminal 10 is programmed to function as a portable data transmitting/receiving terminal for a central data processing unit, the two RAMs 62 and 64 function in a similar manner to store security access codes to the data processing unit standard, often repeated alphanumeric information, as well as a means for storing the message or data transmitted.

Two EPROMs 66 and 68 provide non-volatile memory means for storing the programs for controlling the microprocessor 50 to function as a communications aid for the hard of hearing or for a remote data transmitter/receiver terminal to a data processing unit. As illustrated and described further hereinbelow, the microprocessor 50 has selection jumpers to provide for increased memory storage capabilities for the EPROMs selected when the communications terminal 10 is to function as a remote data terminal.

Keyboard function is provided by the microprocessor 50 with the decoder 56 and input/output select logic 60 writing a 4-bit pattern to a latch 70 that latches this pattern to a decoder 72 which will decode this BCD code into one of ten positions in a column, one column at a time. The microprocessor 50 then causes the input/output select logic 60 to form an input/output read operation that reads one row of a tristate buffer 74 to determine the signals from the keyboard 34. If microprocessor 50 finds no keys have been depressed on that row, it sends out another address to the latch 70 until it determines that a particular row in a column has been selected, and the microprocessor 50 then knows what character has been depressed.

In the write operation, the microprocessor 50, the operation decoder 56 and input/output select logic 60 cause the audio transducer 76 to be pulsed at a particular sequence to generate the desired tones for the data message in accordance with the program in the EPROMs 66 and 68. There are two routines in the program for the two different tones which are produced by pulsing or relaxing the audio transducer 76 for a certain period of time. Another part of the program in memory determines the bit patterns that will select these two tone frequencies for transmitting alphanumeric information. The twelve character alphanumeric display 32 in the preferred embodiment consists of three LED displays 78, 80 and 82. The information in the LED displays 78, 80 and 82 are scrolled or rolled across the visual display 32 for the user. This is accomplished by a program contained in EPROMs 66 and 68.

When the unit 10 is in the receive mode an audio transducer (receive) 84 receives the audio tones to be Frequency Shift Key (FSK) decoded by receive circuitry 86, which in the preferred embodiment of the invention is essentially an operational amplifier and phase locked loop that determines the frequency that it will give the indication that it has received a particular tone. The signal from the FSK decoder circuit 86 is input to the tristate buffer 74 for the microprocessor 50 to decode the incoming information. The decoded message is also displayed in scroll type fashion in the LED displays 78, 80 and 82.

A user may control the communications terminal 10 by depressing certain function coded keys of the keyboard 34 to select certain of the programs available to the user in the unit 10. A user can determine if the message to be transmitted is to be in Baudot code to be compatible with a TTY receiver unit, or to indicate that the message is to be sent in the transmission protocol unique to the telecommunications system of the present invention. By selecting the transmission protocol of the telecommunications system of the present invention, a user may encode, store in memory and edit an entire message prior to transmission and then transmit the entire message to a compatible receiver unit of the present system. In the transmission protocol of the present invention, the received information is seen in the visual display 32 of the receive unit as it scrolls across the line. The entire message could be sent by depression of the ENTER key 38 to transmit the entire message. In this transmission mode of the present invention, the user has the advantage of coding the entire message in memory, editing the message prior to transmission, and then transmitting the message over the telephone line at a faster rate, approximately 300 Baud, over the telephone line to the communications terminal 10 acting as the receive unit to receive the message and verify its reception. Verification of the transmission reception of the message may be accomplished with the use of a block check character and sent back for verification to the transmitting communications terminal 10 to indicate that the message was properly received.

Figure 3:
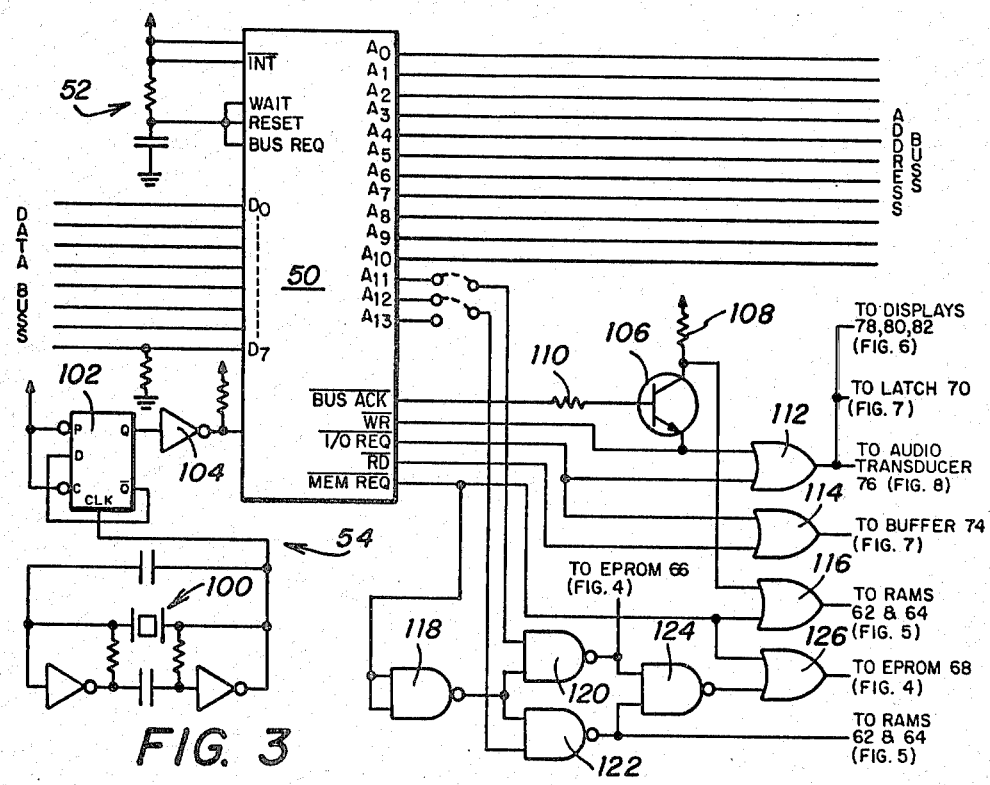
FIG. 3 is a schematic drawing of the clock, microprocessor and operation decoder of the present invention.

The communications terminal 10 is shown in greater detail in the electrical schematic diagrams of FIGS. 3-8. In FIG. 3, the microprocessor 50 is driven at two megahertz by the clock circuitry 54 consisting of a crystal oscillator 100 for providing a four megahertz signal to a flip-flop 102 for dividing the frequency of the clock signal by two. The two megahertz signal from the flip-flop 102 is inverted by an inverter 104 and applied to the clock terminal of the microprocessor 50. The power on/reset circuitry 52 causes the microprocessor 50 to reset when powered on. Once reset a program stored in EPROMs 66 and 68 causes unit 10 to go through a series of short diagnostics to assure that the communications terminal 10 is operating properly and that there is memory to which the microprocessor 50 can read and write. As part of the initialization of the communications terminal 10, the program will cause the microprocessor 50 to check the semi-permanent data area in the RAMs 62 and 64 to determine that information stored there is still on file.

The eight bit data words enter the microprocessor 50 through the data lines $D_0$–$D_7$, and the microprocessor 50 has address lines $A_0$–$A_{10}$ connected to the address buss of the system. Address pins $A_{11}$, $A_{12}$ and $A_{13}$ illustrate the different options available to allow the communications terminal 10 to use different EPROMs to expand the terminal 10 from a 4K EPROM unit when programmed for use as a communications aid for the deaf or hard of hearing to an 8K EPROM unit when programmed for use as a data communicator without changing additional circuitry. An NPN transistor 106 has its collector connected to $V_{cc}$ through a pullup resistor 108, and its base is connected to the $\overline{BUS\ ACK}$ (buss acknowledge) terminal of the microprocessor 50. The emitter of transistor 106 is connected to the $\overline{WR}$ terminal of the microprocessor 50. The transistor 106 functions to eliminate some of the adverse conditions of the microprocessor 50 "flailing" when the processor is shut off. The circuitry of transistor 106 protects portions of memory from being changed when the microprocessor 50 is powered off.

The remaining array of logic gates of FIG. 3 are the function decode and address decode circuitry shown in FIG. 2 as the blocks labeled operation decoder 56, memory select logic 58, and input/output select logic 60. The exclusive OR gate 112 has its inputs tied to the $\overline{WR}$ and $\overline{I\ REQ}/$ terminals of the microprocessor 50 to apply a low going pulse to enable the output ports to write and applies the data signals to displays 78, 80 and 82, to the latch 70, and to the audio transducer 76 for transmission over ordinary telephone lines. The two inputs of exclusive OR gate 114 are tied to $\overline{I\ REQ}/$ and the $\overline{RD}$ terminals of the microprocessor 50 to apply a signal to the the buffer 74 to read the output of a row of the keyboard 34. Exclusive OR gate 116 has one input tied to $V_{cc}$ through pullup resistor 108 and a second input from the $\overline{MEMEQ}/$ terminal of the microprocessor 50 to access memory by enabling the RAMs 62 and 64.

To read data from the RAMs 62 and 64 and to read the program instructions from EPROMs 66 and 68, the $\overline{MEMEQ}/$ signal is applied from the microprocessor 50 to two terminals of a NAND gate 118. The output of the NAND gate 118 is applied to an input terminal of NAND gate 120 and an input terminal of another NAND gate 122. A second terminal of NAND gate 120 is connected through a jumper cable to address terminal $A_{11}$ of the microprocessor 50 to select the EPROM 66. A second input terminal of the NAND gate 122 is connected to address line $A_{12}$ of the microprocessor 50 through a jumper cable. The output of NAND gate 122 is tied to NAND gate 124 having a second input terminal connected to the output of NAND gate 120. The output of NAND gate 124 is applied to one of the input terminals of exclusive OR gate 126 which has it second input terminal connected to the $\overline{MEMEQ}/$ terminal of the microprocessor 50 to select the second EPROM 68. The output of the NAND gate 122 is also applied to the RAMs 62 and 64 to read from memory.

Figure 4:
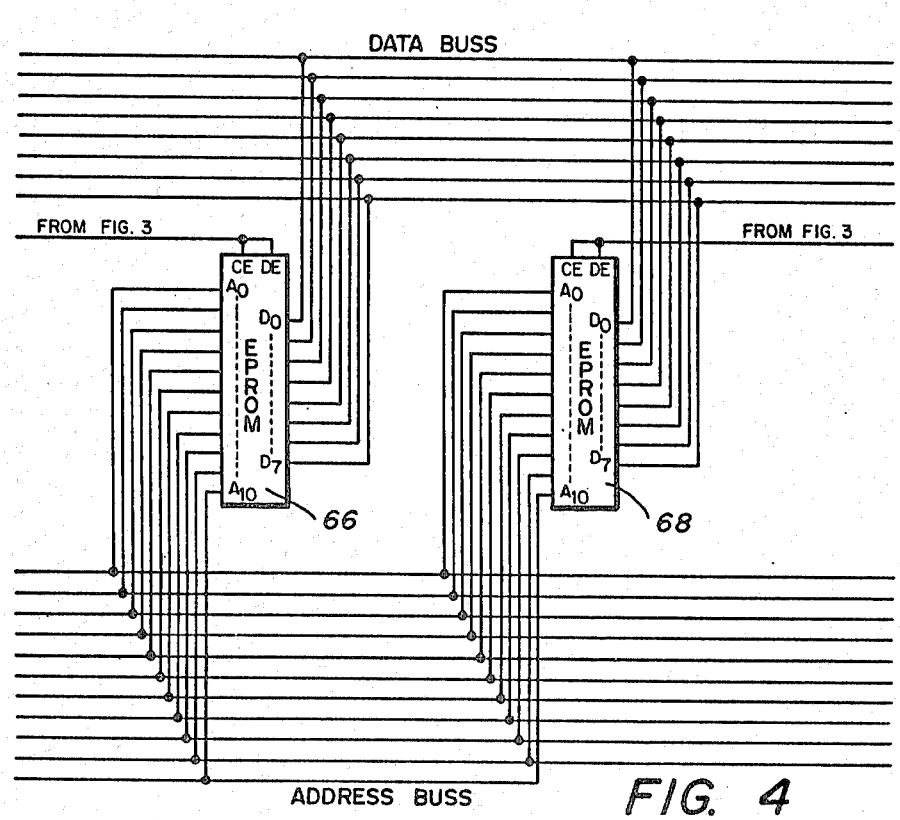
FIG. 4 is a schematic view of the two EPROMs of the present invention.

FIG. 4 illustrates the two EPROMs 66 and 68 enabled by the output of NAND gate 120 and the output of OR gate 126 (FIG. 3). The EPROMs 66 and 68 have their data terminals $D_0$–$D_7$ connected to the data buss, and their address terminals $A_0$–$A_{10}$ connected to the address buss.

Figure 5:
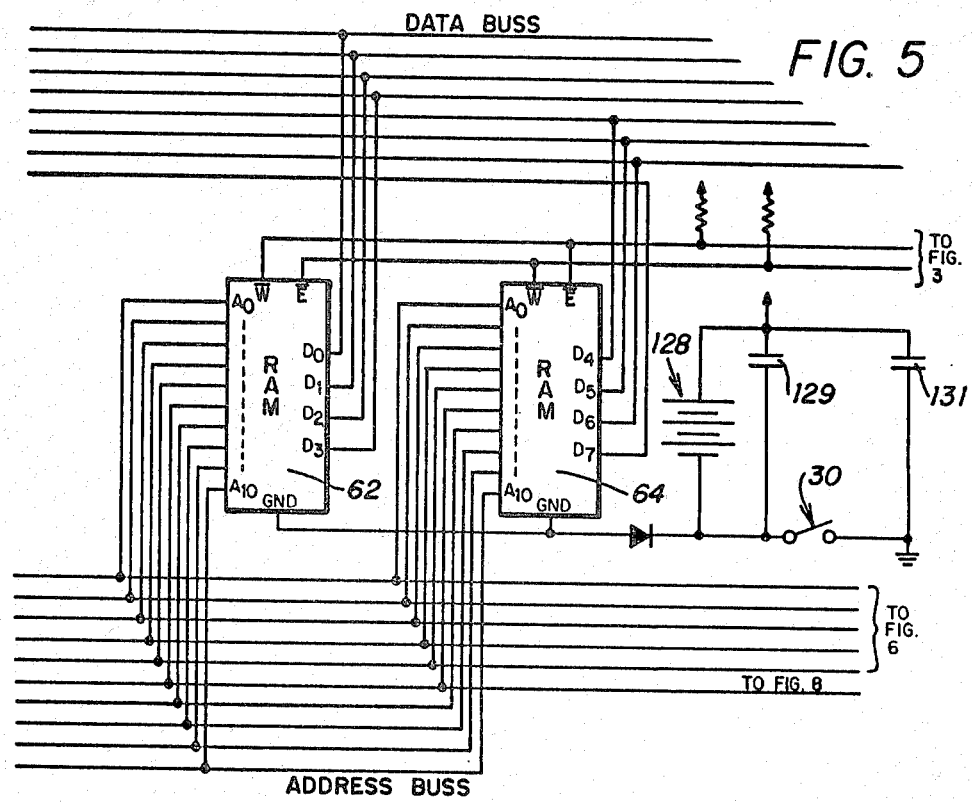
FIG. 5 is a schematic view of the two RAM memory devices and battery power unit of the present invention.

FIG. 5 illustrates the RAMs 62 and 64 have their data terminals connected to the data buss to provide eight bits of random access memory and have their address terminals $A_0$-$A_{10}$ connected to the address buss. The $\overline{W}$ (write) terminals of the RAMs 62 and 64 are connected to the output of the exclusive OR gate 116 (FIG. 3) and the $\overline{E}$ (enable) terminals of the RAMs 62 and 64 are connected to the output of the NAND gate 122 (FIG. 3). FIG. 5 also illustrates the battery 128, filters 129 and 131 and the power on/off switch 30 for turning the communications terminal 10 on and off. The battery 128 may be a Nickel-Cadmium rechargeable battery.

Figure 6:
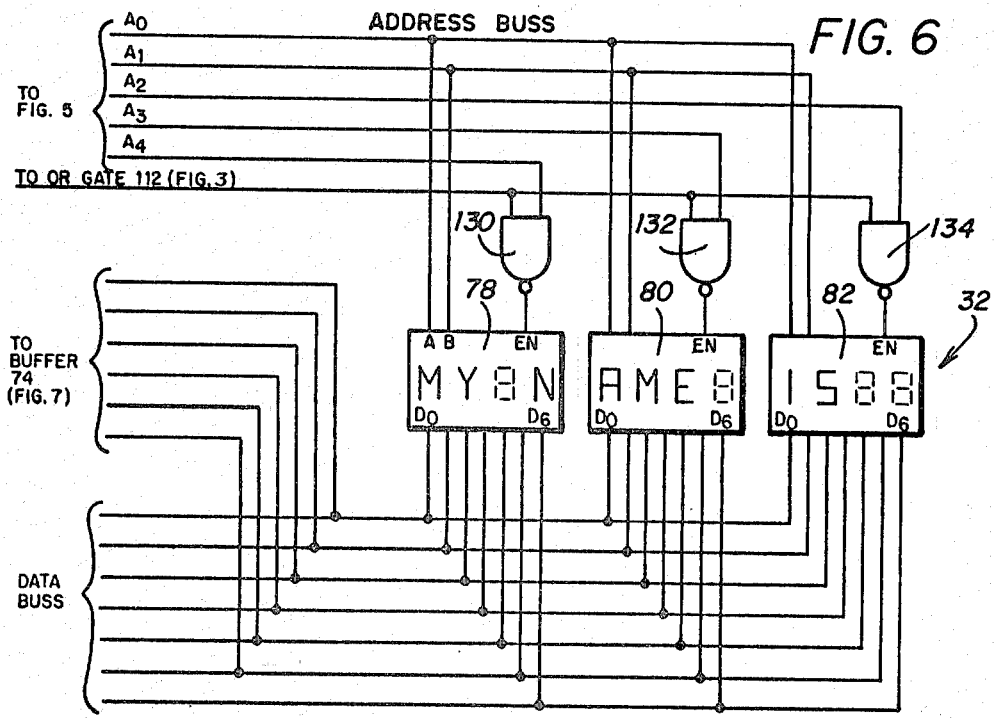
FIG. 6 is a schematic view of the LED visual display unit of the present invention.

FIG. 6 illustrates the twelve digit alphanumeric light emitting diode display 32, including light emitting diode displays 78, 80 and 82. The displays 78, 80 and 82 are controlled by an enable signal from NAND gates 130, 132, 134, respectively. One input terminal of the NAND gates 130, 132 and 134 is connected to the output of OR gate 112 (FIG. 1), which is the I/O write signal, and the other input of the NAND gates 130, 132 and 134 are the address lines $A_4$, $A_3$ and $A_2$, respectively, of the address buss. Address lines $A_0$ and $A_1$ of the address buss are used to select digits within each of the displays 78, 80 and 82. The data lines to the displays 78 and 80 are connected to the data buss.

Figure 7:
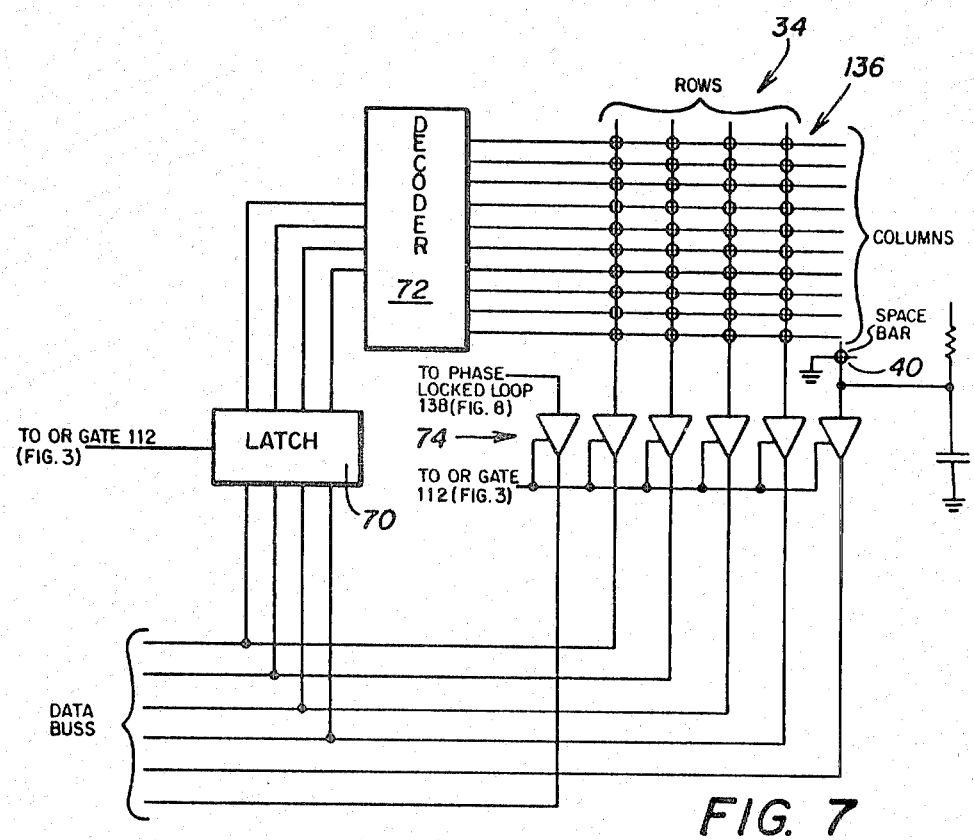
FIG. 7 is a schematic view of the keyboard encoder and tristate buffers of the present invention.

FIG. 7 illustrates the keyboard 34 for the full ASCII standard typewriter keyboard. The keyboard matrix is shown as forty circles formed by the intersection of ten columns and four rows representing the alphanumeric information on the ASCII standard typewriter keyboard as well as the keys representing the programmable functions selectable by the user. Microprocessor 50 causes the latch 70 to latch the information from the data buss in the decoder 72 until the state of the latch 70 is changed. The four bit BCD pattern from the latch 70 is decoded by the decoder 72 to a decimal number representing one of the ten columns of the keyboard matrix 136. Microprocessor 50 is rapidly changing the four bit BCD pattern that latch 70 places in the decoder 72, so that it is constantly scanning the keyboard 34 to determine the row and column of the key that has been depressed. The output of the buffers 74 next to the four rows of the keyboard matrix 136 are applied to the common data buss. The space bar 40 has a separate buffer in the buffers 74 which has its output connected to the common data buss. The leftmost buffer of the buffers 74 has its input connected to the output of the phase locked loop circuitry 138 (FIG. 8) of the receiver circuit.

Figure 8:
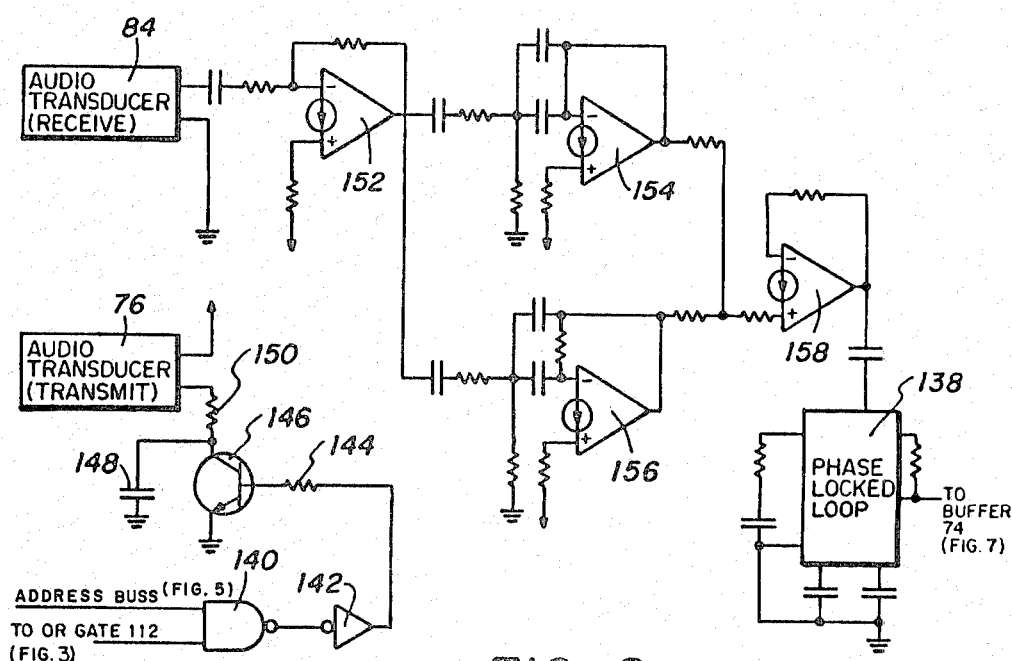
FIG. 8 is a schematic view of the audio tone generator and audio tone receiver circuitry of the present invention.

FIG. 8 illustrates the circuitry for the audio transducer (transmit) 76 and the audio transducer (receive) 84. The audio transducer (transmit) 76 circuitry includes a NAND gate 140 having one input connected to the output of OR gate 112 (FIG. 3) and the second input connected to an address line of the address buss in order to address this gate. The output of the NAND gate 140 is inverted by inverter 142 and applied through a resistor 144 to the base of a NPN transistor 146, which has its emitter connected to ground and its collector connected to ground through a capacitor 148. The transistor's collector is connected through a resistor 150 to the input terminal of the audio transducer 76. Another terminal of the audio transducer 76 is connected to the power supply for the communications terminal 10.

The receive circuitry for the audio transducer (receive) 84 is also illustrated in FIG. 8 and includes one output terminal connected to ground and a second output terminal connected through a resistive capacitive network to an amplifier 152, filters 154 and 156, and a summing amplifier 158. The output from summing amplifier 158 is applied to the phase locked loop circuitry 138. The phase locked loop 138 is set to one of two frequencies to be received, and when it locks on that frequency it will give a one or a high state on the output line connected to the leftmost buffer of the tristate buffers 74 (FIG. 7).

In operation as a communications device for the deaf or hearing impaired, the communications terminal 10 may be conveniently carried for use at any location where a telephone set is available. When in use, the communications terminal 10 is conveniently opened up as illustrated in FIG. 1, and the telephone hand set 16 is placed upon the acoustic coupling unit 12, and the encoder and display unit 14 is available for the user to control operation of the telecommunications system.

The user begins operation by turning on the battery powered communications terminal 10 at the power on/off switch 30. The microprocessor 50 then is programmed to go through a short diagnostic routine. To initialize the system for operation, one of the programmable diagnostics is to determine that the prerecorded data and messages stored in the volatile memory unit (RAMs 62 and 64) is available to the user. The terminal 10 may be placed in the transmission mode by a keyboard entered program code to the microprocessor 50. The user may then select the type of transmission mode by determining if the receiving unit is accessible only through the Baudot code or if it is a compatible communications terminal 10 of the present telecommunications system which may be communicated with in the system's own unique transmission protocol.

If the user selects the Baudot code through a preprogram code entered through the keyboard 34, the communications terminal 10 is in the transmit mode when an alphanumeric symbol is encoded through the depression of a key, and it is in the receive mode when the key is released. The visual display 32 illustrates each alphanumeric character which is being transmitted.

If the receiving unit is a telecommunications terminal 10 of the telecommunications system of the present invention, then the user may select the transmission protocol of the present invention by entering the appropriate code through the keyboard 34 to activate that program. Operating in the system's protocol, the user may improve the time necessary to encode the message and transmit it to another unit. The user may store in the volatile memory, the RAMs 62 and 64, introductory information about the transmitter, as well as any desired words or phrases. Just by way of example, the user could enter into the volatile memory portion of the terminal 10 his name, identifying information such as address, telephone number and social security number, and standard phrases such as "beginning of message", "my name is ____", "end of message". Communications terminal 10 is versatile in allowing the user to select the prerecorded information placed in storage which is most advantageous to him. Of course, the reader may edit and change the information in nonvolatile memory by entering the necessary function code in the terminal 10. The typewriter keyboard layout may allow the user to rapidly enter his message, watching the message scroll across the visual display 32 to check for errors. The communications terminal 10 includes an edit function in its program to allow the user to edit the message prior to its transmission. The user may also select through the stored program the desired speed for the information which is scrolled across the visual display unit 32 in either the transmitting or receiving mode.

Using the system's protocol, the completed text of the message may be transmitted at a higher rate of speed after the entire message has been entered by depressing the enter key 38. As a communications aid for the hard of hearing, the terminal 10 operates at a transmission rate of approximately 300 Baud. The communications terminal 10 saves space and weight by using a scheme of software generated audio tones in a frequency shift key transmission system.

When the message is received by the other communications terminal 10, it will receive additional information from the microprocessor 50, such as the length of the message, a block check character and a parity character check so the receive unit 10 can verify that it has received exactly what was transmitted. The terminal 10 may be set in the receive mode by a keyboard entered program code. If the receive communications unit 10 has not received exactly what was transmitted, it will send an error signal to the transmitting terminal 10. This is an improvement in the accuracy of transmitting such messages over the existing Teletypewriter systems and the like in which one character at a time is transmitted without any means for verifying that it has been received. The message that is received from the transmitting unit will be placed in a volatile memory unit, RAMs 62 and 64, and the received unit 10 will redisplay the message if necessary across the visual display 32. The scroll speed of the visual display 32 will be user selectable as another programmable feature of the computer terminal 10.

The communications terminal 10 of the telecommunications system of the present invention is also programmable to serve as a remote data transmitting and receiving terminal for use with a centralized data processing unit or other electronic digital signal processor. As a portable data communications terminal, the communications terminal has numerous commercial applications for service representatives, salesmen, adjusters, utility meter readers, inspectors and others. Service representatives can input any data requirements and the communications terminal 10 error checks the input data and transmits the data to a home office or central data processing unit for storage and/or computation. The communications terminal 10 may also be operated in the receive mode to receive information from the central processing unit such as dispatching service calls.

The communications terminal 10 of the present invention includes jumper selected cables to the microprocessor 50 for enabling EPROM having a greater program capacity to be inserted into the communications terminal 10 when it is used as a data communications terminal.

While the communications terminal 10 of the telecommunications system of the present invention has been described in detail herein in one preferred embodiment as a communications system for the deaf or hearing impaired and another embodiment as a remote data communications transmitter/receiver, it will be evident that various and further modifications are possible without departing from the scope and spirit of the present invention.

We claim:

1. A portable communications terminal for use in a telecommunications system to enable communications over ordinary telephone lines, comprising:

an electronic digital signal processor for processing alphanumeric information transmitted and received by the communications terminal;

first memory means for storing program instructions for said electronic digital signal processor;

a keyboard for entering instructions to said electronic digital signal processor and for entering alphanumeric information to be transmitted by the communications terminal;

second memory means for storing keyboard encoded alphanumeric information for transmission;

visual display means for visually displaying keyboard entered information and for providing a visual display of alphanumeric information received by said terminal;

a first audio transducer means for transmitting software generated audio tone pulses from said electronic digital signal processor and a second audio transducer means for receiving audio tone pulses, including means for acoustically coupling said first and second audio transducer means to a telephone hand set;

means for selecting transmission and receiving modes of said communications terminal for enabling a user to transmit and receive messages in Baudot code on a character by character basis or in a block of alphanumeric information for communications with another communications terminal in a transmission protocol unique to the telecommunications system;

means for entering a block of alphanumeric information from said keyboard;

means for editing the entered block of alphanumeric information prior to transmission;

means for transmitting the edited block of alphanumeric information wherein said block is transmitted at a higher speed than information transmitted in the Baudot code on a character by character basis; and means for verifying the reception of the transmitted block of alphanumeric information by the other communications terminal.

* * * * *